Sept. 12, 1950        T. C. VAN DEGRIFT        2,522,472
TORSIONAL VIBRATION INDICATOR CALIBRATOR Filed July 7, 1948                                  3 Sheets-Sheet 1

Inventor
Thomas C. Van Degrift
By Spencer, Willits, Helmig & Baillio
Attorneys

Patented Sept. 12, 1950

2,522,472

UNITED STATES PATENT OFFICE 2,522,472

TORSIONAL VIBRATION INDICATOR CALIBRATOR

Thomas C. Van Degrift, Detroit, Mich., assignor to General Motors Corporation, Detroit, Mich., a corporation of Delaware Application July 7, 1948, Serial No. 37,377

3 Claims. (Cl. 73—1)

The present invention relates to torsional vibration indicator calibrators. More particularly, it relates to torsional vibration indicator calibrators which include means for introducing a uniform angular velocity adjustable over a large range, and means for superimposing a torsional oscillatory motion on the rotation of uniform angular velocity. This torsional oscillation is adjustable in both amplitude and frequency throughout a wide range.

With the advent of high compression high speed internal combustion engines, the necessity of providing accurate torsional vibration indicating equipment has greatly increased. This has created a necessity for developing highly accurate calibrating equipment for these indicators. Previous to the present invention a certain number of torsional vibration indicator calibrators have been designed. These calibrators lack the necessary flexibility for calibrating internal combuston engine crankshaft torsional vibration indicators throughout their usable range.

It is therefore an object of the present invention to provide an indicator calibrator of simple construction and flexible utility.

It is also an object of the present invention to provide a torsional vibration indicator calibrator of increased flexibility and accuracy capable of calibrating torsional vibration instruments throughout a wide range of rotating velocities and torsional vibration frequencies.

The calibrator which is the subject of the present invention may also be used, under certain conditions, as a source of variable angular velocity with variable frequency torsional vibration of adjustable amplitude superimposed thereon for purposes other than the calibration of instruments.

The present invention is suitable for calibrating torsional vibration instruments in both the static and rotating states.

This instrument is built on the principle of producing known torsional vibration amplitudes by rotating unbalance weights which are carried by a shaft flexibly driven by a source of uniform angular velocity. The frequency of the torsional vibration impulses and the rotational frequency of the instrument-carrying shaft may be varied independently thus permitting great flexibility. The instrument is best adapted to produce torsional vibration frequencies of the range 60 to 360 cycles per second but either lower or higher frequencies may be produced without departing from the scope of this invention. This calibrator may be used for three different methods of calibration, and each of these methods have certain advantages over each other and over the prior art.

Referring to the figures in the drawings, Figure 1 is a general arrangement illustration of the present invention.

Figure 1:
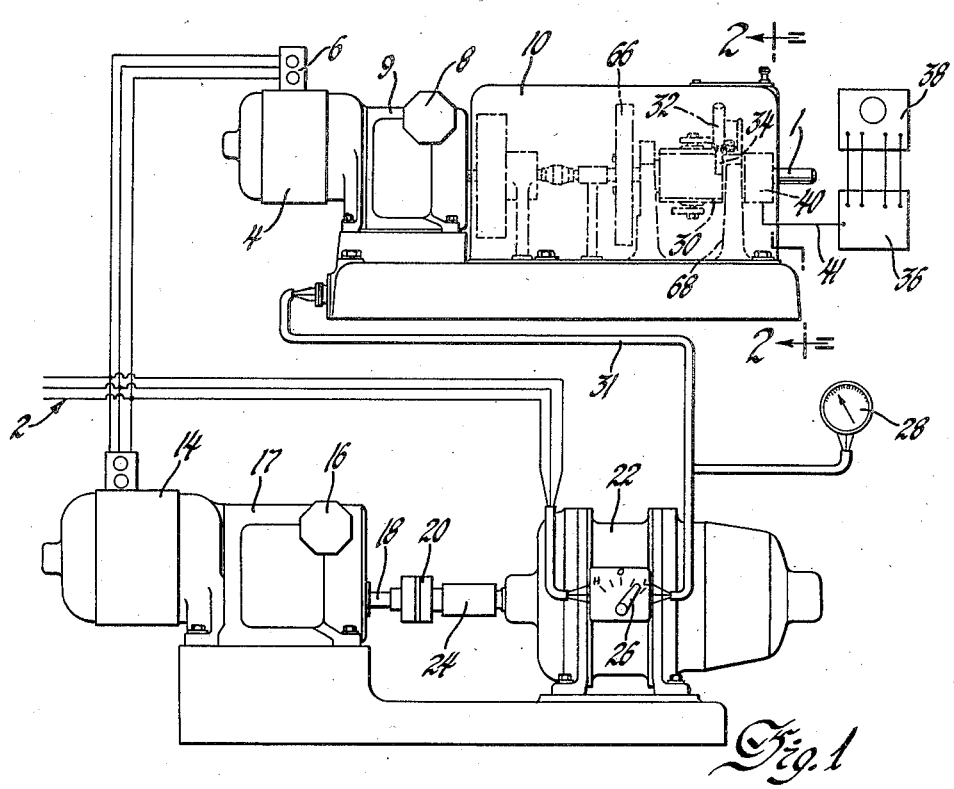

Referring more particularly to Figure 1, a shaft 1 is provided for mounting the torsional vibration indicator to be calibrated. This shaft may be driven with the desired speed, and torsional vibration characteristics for calibrating of the instrument under test, as will be described later. 2 is a three-phase power source of commercial frequency and potential. In certain specific applications of this invention a 60 cycle three-phase 220 volt power line has been found to be quite satisfactory. 4 is a variable speed electrical motor which is energized from the power source 2 by means of switch 6. By means of controller 8 the speed of the motor 4 may be adjusted to give the desired uniform angular velocity of the shaft 1. The shaft 1 is connected to the output shaft of the gear box 9 by a coupling system here shown generally as 10 but which will be described in greater detail in connection with the Figures 2, 3 and 4. The power source 2 is also connected to a second variable speed motor 14. This variable speed motor may be adjusted throughout its speed range by means of controller 16, and is quite similar in its operation to the motor 4 described above. Both of these motors are of a well-known commercial type available on the open market and therefore need not be described in any great detail. The motor 14 through gear box 17, drive shaft 18 and coupling 20 drives a frequency changer unit here shown generally as 22. In one particular modification of this invention the motor 14 is a three-phase, 60 cycle, 220 volt, 1½ horsepower motor. The frequency changer 22 is a commercial changer of the rotating field alternator type. The frequency of the output of this changer is dependent on the frequency of the power source 2, and on the speed of rotation of the armature by the shaft 24. This variation of speed is made infinitely variable by adjusting the speed of rotation of the shaft by operation of the controller 16. Two frequency ranges may be obtained by either rotating the frequency changer armature with or against the field excitation. A three position switch 26 is provided to select either the low (zero to 280 cycles per second), the high (100 to 400 cycles per second) ranges or the off position. When this switch is in the off position, the shaft 1 has no torsional oscillation superimposed upon its rotation of uniform angular velocity. The actual frequency output of this changer is read on the meter 28 and used to energize the torsional oscillation exciter motor 30 through three wire conductor 31. If it is desired to measure the torsional oscillation frequency with greater accuracy than can be obtained by use of meter 28, a flashing light-measuring device of the stroboscopic type may be used for determining the exact frequency of torsional oscillation. This same means may of course be used to determine the exact speed of uniform angular velocity being introduced by the motor 4. A phase shift torsiograph such as shown in United States Patent 2,399,635 to L. F. Hope may also be used to determine the exact torsional oscillation frequency. The amplitude of torsional oscillation may be determined statically by means of microscope 32 and graduated scale 34. This method of static determinations will be described in more detail in connection with Figure 3. The dynamic readings of torsional vibration amplitude (with the calibrator output shaft rotating), may be determined using a phase shaft torsiograph such as is described in U. S. Patent to Hope 2,399,635, dated May 7, 1946. This torsiograph is here shown as 36 and the cathode ray oscilloscope is shown as 38 with electrical connections therebetween. When this torsiograph is used, the electric generating gear and coil such as is shown in the above mentioned patent is built around the output shaft 1 of the calibrator as shown at 40. The output of this signal-generating equipment is coupled to the torsiograph 36 by means of conductor 41. The torsiograph and oscilloscope are both energized by conventional electrical power sources as described in the above patent.

Figure 2:
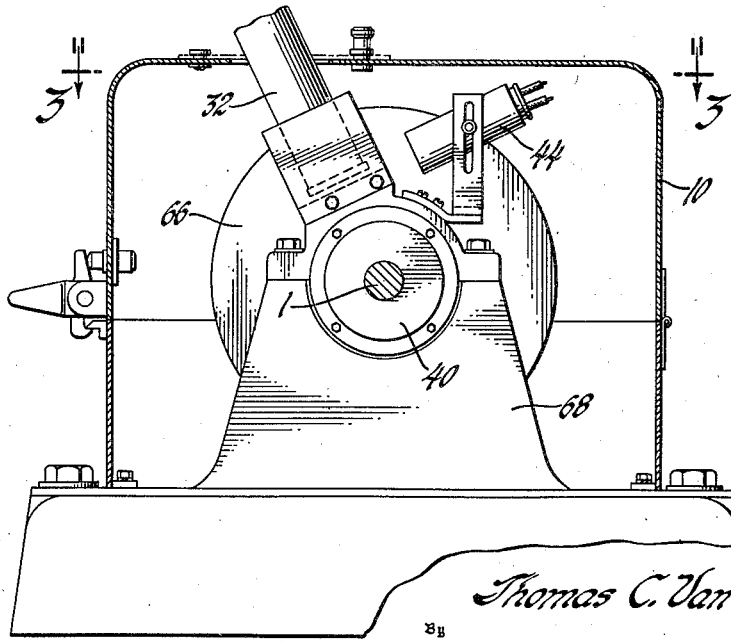
Figure 2 is a partial sectional view taken at 2—2 of Figure 1.
Figure 3:
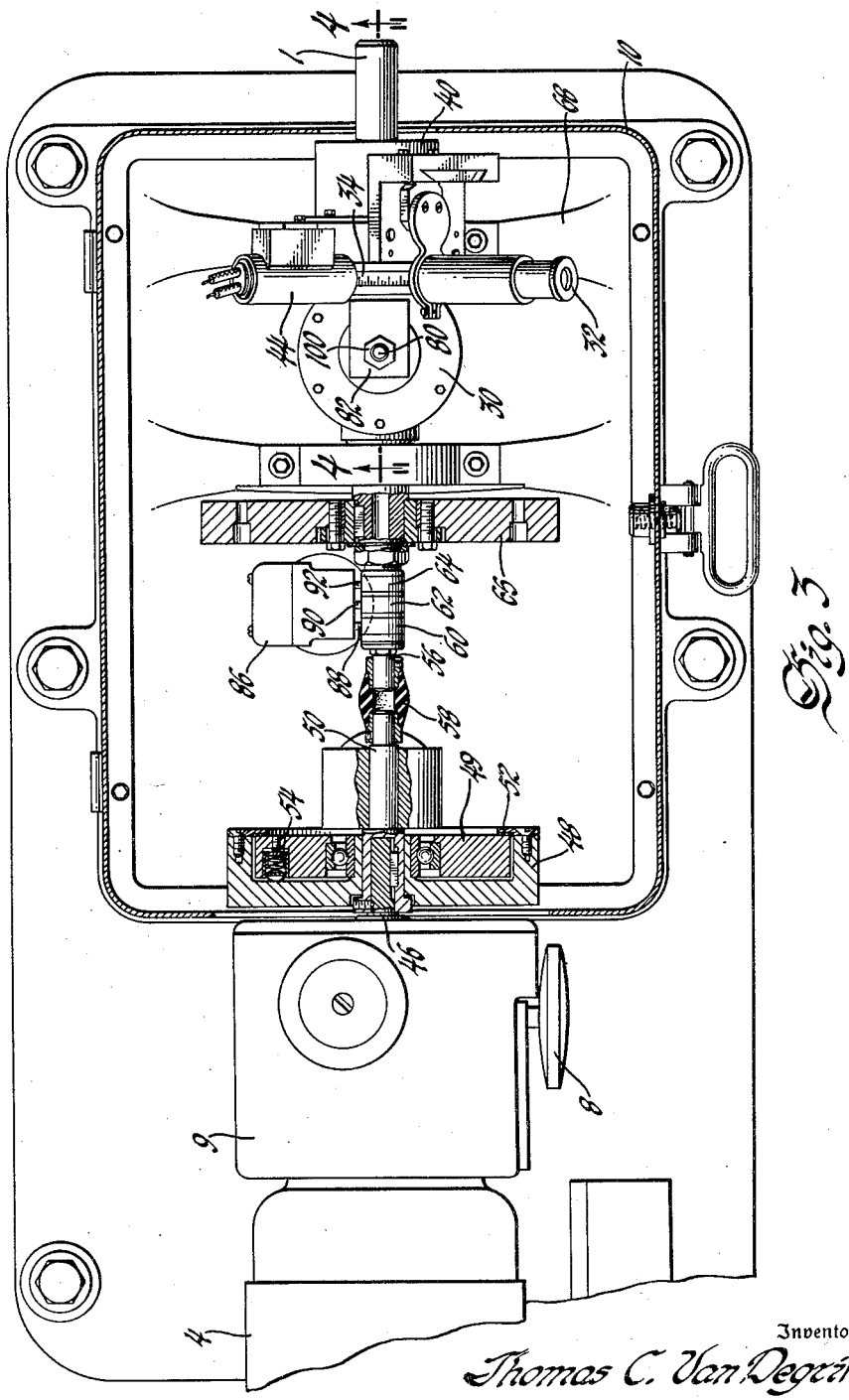
Figure 3 is a partial sectional view taken at 3—3 of Figure 2.

Referring to Figures 2 and 3, the motor 4 is connected to the shaft 46 through gear box 9. This shaft 46 carries a damping fly-wheel 48 which is frictionally connected to an inertia mass 49. This shaft is also directly connected to a shaft 50. The mass 49 acts as a seismic element to help damp out any roughness or irregular rotation introduced by the shaft 46. This seismic element 49 is connected to the fly-wheel 48 by means of clutch facing 52 and is biased into engagement with these clutch facings by means of a spring biased arrangement 54. The shaft 50 is flexibly connected to shaft 56 by means of a rubber coupling 58. This rubber coupling 58 permits the introduction of torsional oscillation frequencies into the shaft 56 without these oscillations being reflected back into the driving shaft 50. It also acts as a soft driving element to minimize the effect of any non-uniform angular velocity present in shaft 50. The shaft 56 is rigidly attached to and carries the rotating units to the right of the coupling 58. These rotating units include slip rings 60, 62 and 64, fly-wheel 66, the exciter unit 30, the graduated indicating ring 34, the torsiograph gear included in the housing 40 and the coupling shaft 1. The housing 40, which encloses the torsiograph mechanism as indicated in Patent 2,399,635 Hope, is rigidly attached to the frame of this mechanism.

Figure 4:
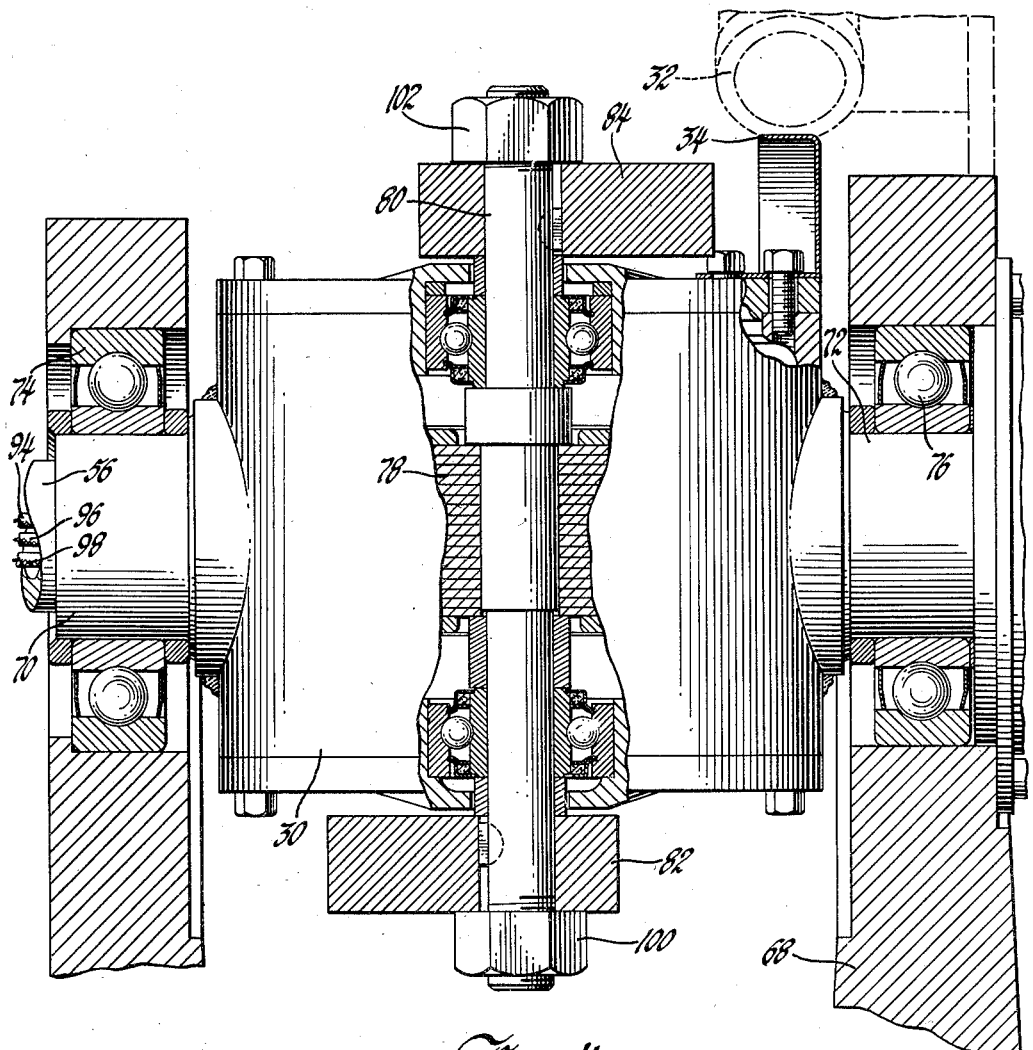
Figure 4 is a partial sectional view taken at 4—4 of Figure 3, and showing certain details of the exciter unit.

Referring to Figures 3 and 4, the main shaft carrying the exciter unit 30 is supported at journals 70 and 72 by shielded ball bearings 74 and 76. This shaft is rotated integrally with the units mentioned above since it is rigidly attached to the shaft 56 and also the shaft 1. This main shaft may be rotated at speed range from 590 to 4300 R. P. M. Integral with this main shaft and located between the bearing supports 74 and 76 is the exciter motor 30 with its shaft axis intersecting the main shaft axis at 90°. This exciter motor has an armature 78, an armature shaft 80, and unbalance weights 82 and 84 all rigidly attached to each other and capable of rotating at speeds up to 360 cycles per second depending on the frequency to which this motor is excited by the frequency changer 22. This electric exciter motor is energized by the frequency changer 22 through cables 32, brush holders 86, brushes 88, 90 and 92, slip rings 60, 62 and 64 and conductors 94, 96 and 98. The frequency of this excitation signal and consequently, the speed of rotation of the shaft 80 is indicated by the frequency meter 28. The unbalance weights 82 and 84 mounted on the shaft 80 are phased 180° with each other. These weights are the source of the force coupling causing the torsional vibration of the shaft 1 which is connected to the instrument under test. The rotation of weights 82 and 84 set up forces which are a function of their unbalance inertia forces. These unbalance inertia forces in turn are a function of the mass of the weights 82 and the speed of rotation of the shaft 80 of the exciter motor. In order to obtain the desired amplitude of torsional oscillation, it has been found desirable to use different sets of weights for different desired amplitudes. These weights have therefore been made readily removable by the simple expedient of nuts 100 and 102. The present invention is so designed that it may be used over a very large range of torsional vibration frequency superimposed upon an independently selected rotating velocity from zero to a very high velocity. It is well known that any shaft with appreciable inertia mass resiliently driven has a natural resonant frequency of torsional oscillation. In the operation of the present device, it is very desirable that the frequency of the torsional forces set up by the rotating weights 82 and 84 is not near the resonant frequency determined by the rotating mass of the assembly and the resilient coupling 58. In order to shift the resonant frequency of the rotating mass so that the entire range of torsional oscillation frequencies may be utilized for accurate calibration, a removable fly-wheel 66 is provided. The attachment of this fly-wheel moves the natural resonant frequency of the system to below any range of torsional oscillation frequency necessary for the calibration of most instruments. The addition of this fly-wheel of necessity decreases the amplitude of torsional oscillation set up for a given force. It has therefore been found desirable to detach this weight when it is desired to calibrate an instrument at the maximum amplitude of torsional vibration of the calibrator.

The case of the exciter motor carries thereon an index plate 34 having graduations thereon. These graduations are illuminated by electric light 44 which of course may be energized by any suitable source of electrical power. These graduations may be read to a high degree of accuracy by use of microscope 32. This microscope has a measuring scale in the eyepiece reading .001" for each graduation thereof. These graduations of course may be in seconds, minutes or degrees without departing from the scope of the present invention. A suitable index marking is noted on the bracket 34 and its amplitude of traverse across the graduated scale of the microscope is noted and the amplitude of oscillation thereby determined. This method of measuring of course may be only used when the shaft 1 is stationary and the exciter motor 30 energized. This is however a quite desirable method of obtaining accurate calibration of the calibrating instrument itself.

Dynamic reading of the torsional vibration amplitude, that is with the calibrator output shaft rotating, can be easily determined by using a torsiograph such as shown in the above mentioned Hope patent.

METHOD OF OPERATION

The calibrator described in the present application may be used to produce torsional oscillations alone or produce torsional oscillations superimposed on a uniform rotational velocity. This output may be used to energize any desired equipment but is specifically designed for testing torsional oscillation measuring meters. The following three methods of testing have been found to give highly satisfactory results:

*Method 1.—Using microscope, shaft stationary*

It is sometimes desirable to have a source of torsional oscillation of uniform frequency and amplitude without any rotation of the shaft other than oscillatory motion. By following the steps enumerated below, the present invention may be used in such a manner.

1. Attach the instrument or mechanism which it is desired to be actuated to the shaft 1.
2. Install a set of weights 82 and 84 to give the desired amplitude of oscillation.
3. Turn on the lamp 44 and adjust the eyepiece of the microscope 32 to give proper illumination of the graduation on the member 34.
4. Energize the exciter 30 adjusting the variable frequency energization thereof to get the desired frequencies of torsional oscillation. By observing the amplitude of transverse of the graduations on the hairline in the telescope 32, the amplitude of oscillation may be accurately determined, the weights 82 and 84 having been selected to give amplitudes in the order of magnitude desired.

*Method 2.—Using static readings of Method 1 to determine torsional oscillation data with main shaft rotating*

It is sometimes quite desirable to determine how the angular velocity of uniform rotation of the shaft under test effects the torsional oscillation instrument being tested. If the instrument is calibrated under one set of conditions, its indications may be quite different under another set of conditions. In order to determine this variation, Method 2 is used.

1. Place the instrument which has been calibrated under static conditions on the shaft 1 of the calibrator.
2. Energize the motor 4 and adjust the speed change gearing 9 so as to give a desired uniform velocity of the output shaft.
3. Superimpose on this uniform velocity the same torsional oscillation frequency and amplitudes used in the static calibration by using the same energization as the exciter 30 and the same weights 82 and 84 as previously used.

By thus varying the uniform velocity under the desired range, the discrepancies of the indicator being calibrated may be determined and compensated for when the indicator is used for determining torsional oscillation frequencies and amplitudes.

*Method 3.—Calibration using phase shift torsiograph*

It is sometimes quite desirable to calibrate indicators not amenable to calibration under static conditions as described in Method 1. When it is desired to calibrate such indicators, a phase shift torsiograph such as is shown in U. S. Patent to Hope 2,399,635 may be used in combination with the present invention.

1. Attach the phase shift torsiograph as described above in connection with Figure 1.
2. Attach the indicator to be calibrated to the shaft 1.
3. Attach the desired weights 82 and 84 and energize the exciter motor 30 to give the desired torsional oscillation amplitude and frequencies.
4. Energize the motor 4 and adjust the speed change gearing 9 to give the desired uniform angular velocity.
5. Using the present invention as a source of variable uniform angular velocity having a torsional oscillation frequency superimposed thereon, calibrate the indicator using the determinations of the torsiograph to indicate accurately the torsional oscillation frequencies and amplitude.

It is to be understood also that although the invention has been described with specific reference to a particular embodiment thereof, it is not to be so limited, since changes and alterations therein may be made which are within the full intended scope of this invention as defined by the appended claims.

I claim:

1. An apparatus for exciting a shaft with superimposed oscillatory and rotary motion including; a variable speed electric motor, resilient means for transferring rotary motion from said motor to the shaft to be excited, a second variable speed electric motor mounted on said shaft with its axis of rotation transverse the axis of rotation of said shaft, said second electric motor having attached thereto and energized thereby a pair of unbalanced weights capable of being rotated by said electric motor, said weights so arranged that when rotated by said second electric motor they impose upon said shaft a torsional oscillatory motion.

2. A torsional vibration indicator calibrator including; a rotatable shaft capable of being attached to an indicator to be calibrated, resilient means capable of rotating said shaft at a uniform angular velocity, means for superimposing on said uniform angular velocity a torsional oscillatory motion of variable frequency and amplitude, said last mentioned means including a variable speed motor with its axis of rotation located transverse the axis of rotation of said first mentioned shaft, unbalanced weights carried on the armature of and rotated by said motor and so arranged whereby torsional oscillatory inertia forces are imposed upon said first mentioned shaft.

3. Apparatus for exciting a shaft with combined rotatable and oscillatory motion including: a source of rotary motion of uniform angular velocity, resilient means for driving a shaft from said source of rotary motion, means for superimposing a torsional oscillatory motion on said shaft which means includes an electric motor mounted with its axis transverse the axis of said shaft and having unbalanced weights attached thereto so as to set up a rotating unbalance couple in a tangential direction to said shaft.

THOMAS C. VAN DEGRIFT.

REFERENCES CITED

The following references are of record in the file of this patent:

UNITED STATES PATENTS

| Number | Name | Date |
|---|---|---|
| 2,208,648 | Schrader | July 23, 1940 |
| 2,384,987 | Dudley | Sept. 18, 1945 |
| 2,452,031 | Allnutt et al. | Oct. 26, 1948 |

FOREIGN PATENTS

| Number | Country | Date |
|---|---|---|
| 633,117 | Germany | July 20, 1936 |